Patented Aug. 29, 1944

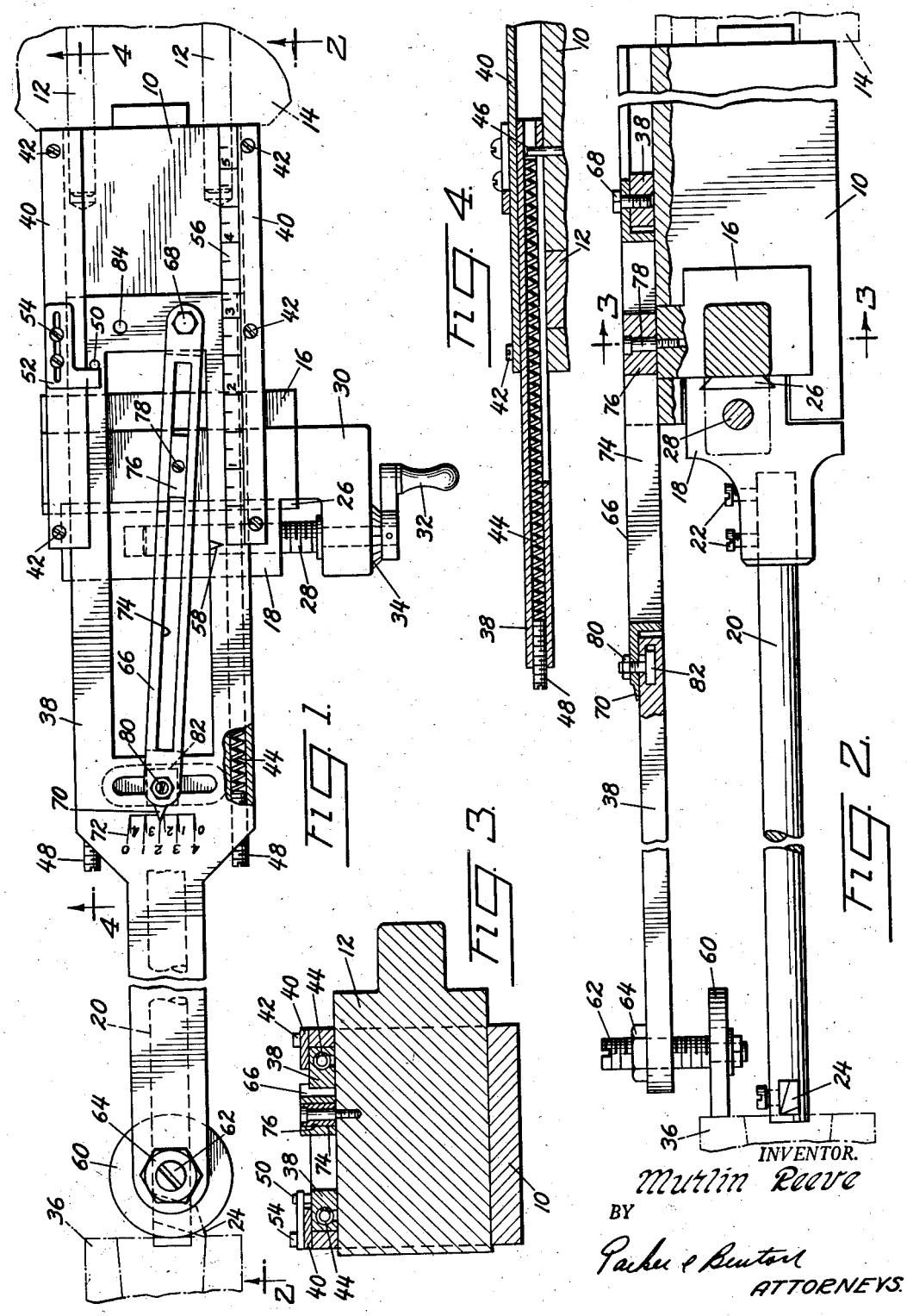

2,357,132

UNITED STATES PATENT OFFICE 2,357,132

TAPER BORING TOOL

Murlin Reeve, Royal Oak, Mich.

Application August 25, 1943, Serial No. 499,985

8 Claims. (Cl. 77—58)

This invention relates to improvements in taper boring tools.

An object is to provide a taper boring tool provided with simple control mechanism whereby the tool may be set to cut to predetermined taper and following such setting the tool will be automatically guided to cut to such a taper.

More particularly an object is to provide a taper guide attachment adapted to be secured to a boring tool fixture to automatically regulate the taper cutting of the boring tool.

This invention is adapted for employment with boring tools such as are mounted on the turret or carriage of a lathe, chucking or other automatic machine.

In this type of machine the tool is advanced axially by the turret or carriage and the work is revolved about the tool during its advance. The tool is so mounted upon the turret or carriage as to be adjusted radially during its axial advance to cut a tapered opening and is capable of being set to cut openings of different diameters.

An object of my invention is to provide an attachment mounted upon the tool supporting fixture and coupled therewith to control the permitted radial movement of the tool during its axial advance according to predetermined setting. The attachment is adjustable throughout the range of selection whereby any desired taper within the range may be elected and the tool will be fed automatically radially during its axial advance to cut to such a taper.

The tool-carrying fixture is provided with a tool-carrying slide which is adjustable radially of the path of axial advance of the tool by the fixture. The taper guide attachment which is combined with the tool-carrying fixture comprises means which are positioned relatively to the work during the cutting action of the tool upon the work and which means include an adjustable taper guide control coupled with the tool-carrying slide to control the radial shifting thereof during the axial advance of the tool.

The construction is such that the movement of the tool may be guided to cut a tapered opening in either axial direction of motion.

The attachment may be fitted to any conventional boring tool and selectively adjusted to automatically control the taper cutting of the tool. Manual adjustment of the tool radially to bore openings of different diameters may be accomplished without interference with the automatic control exercised over the tool.

The taper guide control mechanism is fixedly positioned relative to the work and preferably by contact with the work during the cutting operation as the tool is advanced by the fixture relative to such mechanism during the cutting operation of the tool.

The mechanism includes in addition to the taper selection scale another scale which indicates the extent of axial movement of the tool during the cutting operation.

The construction is such that the taper guide attachment, which operates to automatically feed tool radially according to the particular taper selected, may function only during the cutting operation of the tool. The tool may be advanced axially together with the taper guide attachment without such attachment exercising any control over the movement of the tool. When the tool comes into contact with the work and the taper guide attachment is restrained from further axial advance and positioned relative to the work such attachment commences to function to direct the tool according to selection previously made.

Other objects, advantages and meritorious features of the invention will more fully appear from the following specification, appended claims, and accompanying drawing wherein:

Figure 1 is a plan of my improved taper boring attachment secured to a boring tool fixture.

Figure 2 is a vertical sectional view taken on the line 2—2 of Figure 1.

Figure 3 is a vertical sectional view taken on the line 3—3 of Figure 2.

Figure 4 is a fragmentary vertical sectional view taken on the line 4—4 of Figure 1.

In the drawing and particularly in Figure 2 there is shown a tool-carrying fixture which comprises a fixture body proper indicated as 10 which body may be secured to the turret or carriage of the lathe by dowel pins or the like such as are indicated at 12 in dotted outline in Figure 1 wherein a broken off portion of the turret is indicated as 14. The fixture body 10 is provided with a horizontally extending guideway wherein is slidably mounted a compound tool-carrying slide which consists of the main slide 16 having a subsidiary slide 18. The subsidiary slide 18 carries a conventional tool 20 which may be removably secured thereto by set screws 22 or in any conventional manner. The tool 20 includes a cutting tool element 24.

The main slide which carries the subsidiary slide is adjustable automatically through the horizontal guideway in the fixture body in a manner hereinafter described. The subsidiary slide 18 is slidably horizontally relative to the main slide and is coupled thereto for slidable movement by a dovetail way 26 provided on the main slide and disposed within a corresponding groove formed in the subsidiary slide. The subsidiary slide is adapted to be adjusted along said guideway by a screw 28 carried by an arm portion of the main slide and which screw is provided with a manually operable handle 32. A graduated scale 34 is provided to indicate the adjustment of the subsidiary slide through rotation of the handle 32.

This entire tool-carrying fixture is adapted to be advanced or withdrawn by operation of the turret or carriage 14 of the automatic machine in a conventional manner and with respect to a piece of work indicated in the drawing as 36. Such piece of work is supported in the machine so as to be revolved about the cutting tool 24. The work is shown in dotted outline as provided with a taper opening and the tool is adapted to cut such opening to the desired diameter and taper as the tool is advanced through the work and the work is revolved about the tool.

To this tool-carrying fixture is secured the taper control attachment which forms the crux of my invention and which is adapted to be secured to any suitable tool-carrying fixture of similar conventional character to control the taper cutting of the tool during its axial advance relative to the work.

The taper guide attachment comprises a guide frame 38 which is supported upon the fixture body 10 by frame plates 40. These plates are secured to the fixture body as by screws 42 in such a manner that the guide frame 38 is slidable underneath the frame plates 40 over the fixture body linearly of such body.

Means is provided to hold this guide frame projecting outwardly as shown in Figures 1 and 2. Such means is in the form of a pair of springs 44 disposed within passageways formed in the guide frame 38. Each spring bears at one end against a pin 46 secured to the fixture body 10. The opposite end of the spring bears against an adjustable pin 48 adjustably threaded into the guide frame 38 as indicated in Figures 1 and 4. The normal tension of the spring holds the guide frame outwardly and obviously it may be pushed rearwardly against the tension of these springs. The outward movement of the frame may be limited by a stop pin 50 (Figure 1) which is adapted to abut an adjustable stop plate 52 which plate is secured to the guide frame retaining plate 40 by screws 54 (Figure 1). This plate may be adjusted to vary the outward projection of the taper guide frame. It is apparent that when the plate 52 is secured in the withdrawn position the guide frame 38 will also be held in a withdrawn position and the tool will advance on a straight line axially so long as the roller 60 does not come into contact with the work.

One of the retaining plates 40 is provided with a scale 56 and a pointer 58 is provided upon the guide frame which pointer travels over the scale to indicate the rearward movement of the guide frame with respect to the scale. As will be seen from the description hereinafter this rearward movement of the guide frame, under the conditions described, will measure the forward cutting movement of the tool during the taper boring operation.

At the outer end of the frame 38 is mounted a bearing contact member in the form of a roller 60 supported upon a pin 62 which is adjustable with respect to the frame 38 and is held in position by an adjustable nut 64 as shown in Figures 1 and 2. This roller is shown as adapted to contact the work 36 to position the taper guide with respect to the work during the taper cutting operation of the tool.

Secured to the guide frame is a slotted guide bar 66. This guide bar is pivoted at its rear end to the frame as at 68 (Figure 1) and extends longitudinally of the frame and at its opposite end is provided with a pointer 70 adapted to travel over a dual scale 72 to indicate the angular position of the guide bar with respect to the axial dimension of the tool.

The guide bar 66 is provided with a guideway 74 within which is slidably mounted a guide slide 76 which slide is pivoted to the tool-carrying slide 16 by a pin 78 which guide slide 76 travels through the guideway 74 as the tool-carrying slide is advanced relative to the guide bar.

The guide bar is adapted to be adjustably secured at angular positions which may be measured on the scale 72. Its securement at such angular positions is by means of a nut and bolt arrangement 80 wherein a plate or a head 82 at one end of the bolt travels through a way provided in the guide frame and indicated in dotted line in Figure 1. When the nut is tightened on the bolt the pointer end of the guide bar is fixed in position relative to the frame. The guide bar is shown in Figure 1 as pivoted to the rear end of the frame adjacent one side and the pointer will travel over the inner scale from zero in a clockwise direction toward the opposite end of the scale. This pointer may be shifted from the position shown in Figure 1 and pivoted by inserting its pivot pin into the opening 84 shown in Figure 1 on the rear end of the guide frame but adjacent to the opposite side. When pivoted at 84 the pointer would swing over the outer scale from zero toward the opposite end in a counter-clockwise direction. This is for the purpose of measuring the setting for cutting a taper in either axial direction of movement of the tool.

Assuming the device in position as shown on a taper boring tool of a conventional character as herein disclosed the guide bar 66 is moved angularly to the taper setting desired and the securing nut of the bolt attachment is tightened to secure it at such position. The subsidiary tool-carrying frame 18 will be manually set to cause the cutting tool to cut an opening of the desired diameter. The adjustment stop plate 52 is set so that the contact roller 60 is projected outwardly flush with the cutting tool 24.

As the tool-cutting fixture advances the tool toward the revolving work the taper guide attachment assembly advances with the fixture. As the tool comes in contact with the work and begins the cutting operation the roller 60 comes into contact with the outer face of the work and further forward movement of the taper guide attachment is restrained and such attachment assumes a fixed position relative to the work and maintains such position during the boring operation.

Instead of the roller contacting the face of the work such roller might contact a work holder or other part of the machine at the instant the tool is adapted to commence its taper cutting engagement with the work.

As the cutting tool slide is advanced by the fixture in the advance of the tool it moves forwardly relative to the taper guide attachment and the guide slide 76 travels through the guideway 74 of the guide bar 66 and the cutting tool-carrying slide is shifted radially during its axial advance according to the predetermined selection of the taper. It is apparent that so long as the tool-carrying fixture is advanced relative to the taper guide attachment that this radial shifting of the tool will automatically continue according to the selection made. The tool might be set to cut any desired taper within a possible range or even to follow a straight axial path. Shifting of the pivoted point of the guide bar 66 from one side of the frame to the other as heretofore suggested permits the reduction in the necessary width of the frame over what would be required if the guide bar were pivoted to swing from a center zero in opposite directions therefrom to indicate one taper or the other.

What I claim is:

1. In combination with a tool-carrying fixture supported to advance a tool axially relative to a piece of work being acted upon by the tool and provided with a tool-carrying slide mounted upon the fixture for radial adjustment during such axial advance, a taper guide attachment including means spring urged into contact with the work to be positioned thereby during the axial advance of the tool relative to the work, said means mounted upon the fixture and coupled with the tool-carrying slide to control the radial adjustment of such slide during its axial advance while permitting axial advance of said slide relative to said means.

2. In combination with a tool-carrying fixture supported to advance a tool axially relative to a piece of work and provided with a tool-carrying slide mounted upon the fixture for adjustment radially of the path of axial advance of the tool, a taper guide attachment carried by the fixture having guideway defining means provided with a part adapted to contact the work as the tool moves relatively to the work to position said means relative to the work while permitting relative axial advance of the tool, said part supported to travel rotatably over the work, the guideway portion of said means being adjustable angularly to a plurality of positions relative to the path of axial advance of the tool, a guide slide coupled with the tool-carrying slide and adapted to travel in said guideway to control the radial movement of the tool carrying slide during the axial advance of the slide through said guideway.

3. In combination with a tool-carrying fixture supported to advance a tool axially relative to a piece of work and provided with a tool-carrying slide mounted upon the fixture for adjustment radially of the path of axial advance of the tool, a taper guide attachment mounted upon the fixture for relative axial movement with respect thereto and having a part spring urged into contact with the work being acted upon by the tool, said part defining a guideway extending linearly of the path of axial advance of the slide and adjustable angularly with respect thereto, said slide having a part disposed within said guideway for travel therethrough during the axial advance of the slide and adapted to guide the slide radially during its axial advance.

4. In combination with a tool-carrying fixture supported to advance a tool axially relative to a piece of work and provided with a tool-carrying slide mounted upon the fixture for adjustment radially of the path of axial advance of the tool, a taper guide attachment comprising a frame supported upon the fixture for slidable movement upon the fixture axially of the tool and relative to the tool-supporting slide, spring means urging said frame outwardly toward the work, said frame having a work contact portion at its outer end, adapted to contact the work to permit relative rotation of the work, an arm swingably pivoted to the frame and provided with a guideway and being adjustable to different swingable positions, a guide slide coupled with the tool-carrying slide and mounted within said guideway for travel therethrough during axial advance of the tool relative to the guide slide to control the radial adjustment of the tool-carrying slide.

5. In combination with a tool-carrying fixture supported to advance a tool axially relative to a piece of work and provided with a tool-carrying slide mounted upon the fixture for adjustment radially of the path of axial advance of the tool, a taper guide attachment comprising a frame supported upon the fixture for slidable movement axially of the tool and relative to the tool-supporting slide, spring means urging said frame outwardly relative to the fixture toward the work, a contact roller supported at the outer end of the frame adapted to engage the work to travel rotatably thereover, an arm swingably pivoted to the frame and provided with a guideway, said arm being swingably adjustable to different positions, a guide slide coupled with the tool-carrying slide and mounted within said guideway for travel therethrough during the axial advance of the tool relative to the guide slide to control the radial adjustment of the tool-carrying slide, said tool-carrying slide consisting of two manually relative adjustable parts, one of said parts carrying the tool and the other of said parts carrying the guide slide.

6. In combination with a tool-carrying fixture supported to advance a tool axially relative to a piece of work being acted upon by the tool and having a tool-supporting slide adjustably mounted upon the fixture to permit radial adjustment of the tool during its axial advance by the fixture, a taper guide attachment secured to the fixture and having a part adapted to contact the work to permit relative rotation thereof, said part adapted to be withdrawn away from the work and secured to the fixture in said withdrawn position, said part adapted to position the taper guide attachment relative to the work during the cutting operation of the tool upon the work so long as said part is in engagement with the work, means coupling the tool-carrying slide with said attachment operable during the time the attachment is fixedly positioned relative to the work by contact of said part with the work to control the radial adjustment of the tool during its axial movement.

7. In combination with a tool-carrying fixture supported to advance a tool axially relative to a piece of work being acted upon by the tool and having a tool-supporting slide adjustably mounted upon the fixture to permit radial adjustment of the tool during its axial advance by the fixture, a taper guide attachment secured to the fixture to be advanced with the tool toward the work and having a part adapted to engage the work for rotation relatively thereover to position said attachment axially with respect to the work during the cutting operation of the tool upon the work and to permit the tool to be advanced axially relative to the attachment while the attachment is positioned by the work, said attachment comprising mechanism coupled with the tool-carrying slide and operable to shift the same radially during axial advance of the tool-carrying slide relative to the taper guide attachment.

8. In combination with a tool carrying fixture supported to advance a tool axially relative to a piece of work, a tool carrying slide mounted upon the fixture for adjustment radially of the tool relative to the work during axial advance of the tool, a taper guide attachment mounted upon the fixture to advance with the fixture along its axial line of advancement relative to the work, said attachment supported upon the fixture for adjustment to different positions angularly with respect to the axial line of advancement of the fixture, said attachment having a part adapted to engage the work to restrain advance of the attachment axially with the fixture and when so engaged to permit relative rotation of said part and work, said attachment so mounted upon the fixture as to permit axial advance of the fixture relative to the attachment, means coupling the tool carrying slide with the attachment to actuate the slide radially of the tool during the axial advance of the fixture relative to the attachment when the attachment occupies an angular position with respect to the line of axial advance of the fixture.

MURLIN REEVE.